US008539810B2

(12) United States Patent
Sue et al.

(10) Patent No.: US 8,539,810 B2
(45) Date of Patent: Sep. 24, 2013

(54) METHOD AND APPARATUS FOR CALIBRATING A TORQUE MEASUREMENT

(75) Inventors: Peter Ping-Liang Sue, Greer, SC (US); Lawrence Brown Farr, II, Greenville, SC (US); Derek Ray Wilson, Greenville, SC (US)

(73) Assignee: General Electric Company, Schenectady, NY (US)

(*) Notice: Subject to any disclaimer, the term of this patent is extended or adjusted under 35 U.S.C. 154(b) by 327 days.

(21) Appl. No.: 13/031,770

(22) Filed: Feb. 22, 2011

(65) Prior Publication Data

US 2012/0210767 A1     Aug. 23, 2012

(51) Int. Cl.
*G01L 25/00*     (2006.01)

(52) U.S. Cl.
USPC ... 73/1.11; 73/1.09; 73/862.322; 73/862.324; 73/862.325; 464/23

(58) Field of Classification Search
USPC ............... 73/1.09, 1.11, 862.322, 862.324, 73/862.325; 464/23
See application file for complete search history.

(56) References Cited

U.S. PATENT DOCUMENTS

| | | | |
|---|---|---|---|
| 3,982,419 A | 9/1976 | Boys | |
| 4,064,435 A | 12/1977 | Stebbins | |
| 4,641,027 A | 2/1987 | Renner et al. | |
| 4,805,465 A | 2/1989 | Gerrath et al. | |
| 2004/0255699 A1 | 12/2004 | Matzoll | |
| 2011/0267045 A1* | 11/2011 | Baller et al. | 324/207.25 |

FOREIGN PATENT DOCUMENTS

| | | |
|---|---|---|
| DE | 2231571 A1 | 1/1974 |
| GB | 1008494 A | 10/1965 |
| WO | 9811413 A1 | 3/1998 |

OTHER PUBLICATIONS

Search Report and Written Opinion from EP Application No. 12155668.2 dated Jun. 19, 2012.

* cited by examiner

*Primary Examiner* — Hezron E Williams
*Assistant Examiner* — Paul West
(74) *Attorney, Agent, or Firm* — Cantor Colburn LLP

(57) ABSTRACT

According to one aspect of the invention, a method for calibrating a torque measurement for a rotatable object is disclosed, wherein the method includes coupling the rotatable object to a structure, the structure including a member extending along a length of a surface of the rotatable object, coupling the rotatable object to an adapter and applying a known torque to the rotatable object via the adapter. The method also includes measuring a first rotational displacement via a first sensor coupled to the member at a first axial location of the rotatable object, measuring a second rotational displacement via a second sensor coupled to the member at a second axial location of the rotatable object and determining first and second angular displacements of the rotatable object based on the first and second rotational displacements.

15 Claims, 3 Drawing Sheets

METHOD AND APPARATUS FOR CALIBRATING A TORQUE MEASUREMENT

BACKGROUND OF THE INVENTION

The subject matter disclosed herein relates to turbines and, more specifically, measuring angular displacement of a rotatable shaft to determine torque.

Various machines, such as a gas turbine and/or a steam turbine, may be used to drive a load such as a power generator. In particular, a gas turbine and/or a steam turbine may be used to rotate a magnet within a stator to generate electric power. The power generator includes a shaft which is connected to the rotating magnet and which itself is connected to a large connecting shaft (also called a load coupling shaft) rotated by one or more turbines. The connecting shaft is typically large and stiff, thereby resulting in very small torsional displacements (strains) when a torque is imposed on the connecting shaft. A measurement of torque transmitted through the connecting shaft is made to determine the power output of the turbines rotating the connecting shaft.

In an example, the torque measurement is determined by sensors or gauges configured to measure angular displacement at selected locations in the shaft. The value of the angular measurement is typically very small, often below 1 degree. Accordingly, improved accuracy for sensors and measurements of the angular displacements and corresponding torque also improve the determination of power output for the turbine.

BRIEF DESCRIPTION OF THE INVENTION

According to one aspect of the invention, a method for calibrating a torque measurement for a rotatable object is provided, wherein the method includes coupling the rotatable object to a structure, the structure including a member extending along a length of a surface of the rotatable object, coupling the rotatable object to an adapter and applying a known torque to the rotatable object via the adapter. The method also includes measuring a first rotational displacement via a first sensor coupled to the member at a first axial location of the rotatable object, measuring a second rotational displacement via a second sensor coupled to the member at a second axial location of the rotatable object and determining first and second angular displacements of the rotatable object based on the first and second rotational displacements.

According to another aspect of the invention, apparatus for calibrating a torque measurement of a rotatable object is provided, wherein the apparatus includes a structure to be coupled to the rotatable object, the structure comprising a member extending along a length of a surface of the rotatable object, an adapter to be coupled to the rotatable object, wherein the adapter is configured to apply a known torque to the rotatable object. The apparatus also includes a first sensor coupled to the member and positioned to measure a first rotational displacement of the rotatable object at a first axial location of the rotatable object and a second sensor coupled to the member and positioned to measure a second rotational displacement of the rotatable object at a second axial location of the rotatable object.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
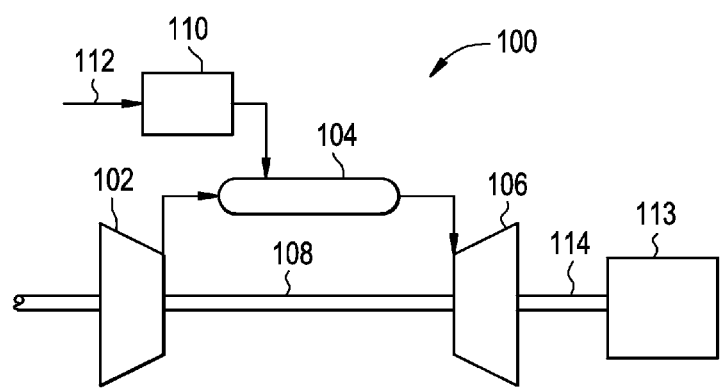
FIG. 1 is a schematic diagram of an embodiment of a turbomachine system.

FIG. 1 is a schematic diagram of an embodiment of a turbomachine system, such as a gas turbine system 100. The system 100 includes a compressor 102, a combustor 104, a turbine 106, a shaft 108 and a fuel nozzle 110. In an embodiment, the system 100 may include a plurality of compressors 102, combustors 104, turbines 106, shafts 108 and fuel nozzles 110. The compressor 102 and turbine 106 are coupled by the shaft 108. The shaft 108 may be a single shaft or a plurality of shaft segments coupled together to form shaft 108.

In an aspect, the combustor 104 uses liquid and/or gas fuel, such as natural gas or a hydrogen rich synthetic gas, to run the engine. For example, fuel nozzles 110 are in fluid communication with an air supply and a fuel supply 112. The fuel nozzles 110 create an air-fuel mixture, and discharge the air-fuel mixture into the combustor 104, thereby fueling a continuing combustion that creates a hot pressurized exhaust gas. The combustor 100 directs the hot pressurized exhaust gas through a transition piece into a turbine nozzle (or "stage one nozzle"), causing turbine 106 rotation. The rotation of turbine 106 causes the shaft 108 to rotate, thereby compressing the air as it flows into the compressor 102. Further, a load 113 is coupled to the turbine 106 via a shaft 114. The rotation of turbine 106 thereby transfers a rotational output through the shaft 114 to drive the load 113. The shaft 114 is subjected to torsional displacements when torque is applied to the shaft, via the connection between the turbine 106 (the driving component) and the load 113 (the driven component). A measurement of torque transmitted through the shaft 114 is used to determine the power output of the turbine 106. An apparatus and method used to calibrate the torque measurement is discussed in detail below with reference to FIGS. 2-3.

Figure 2:
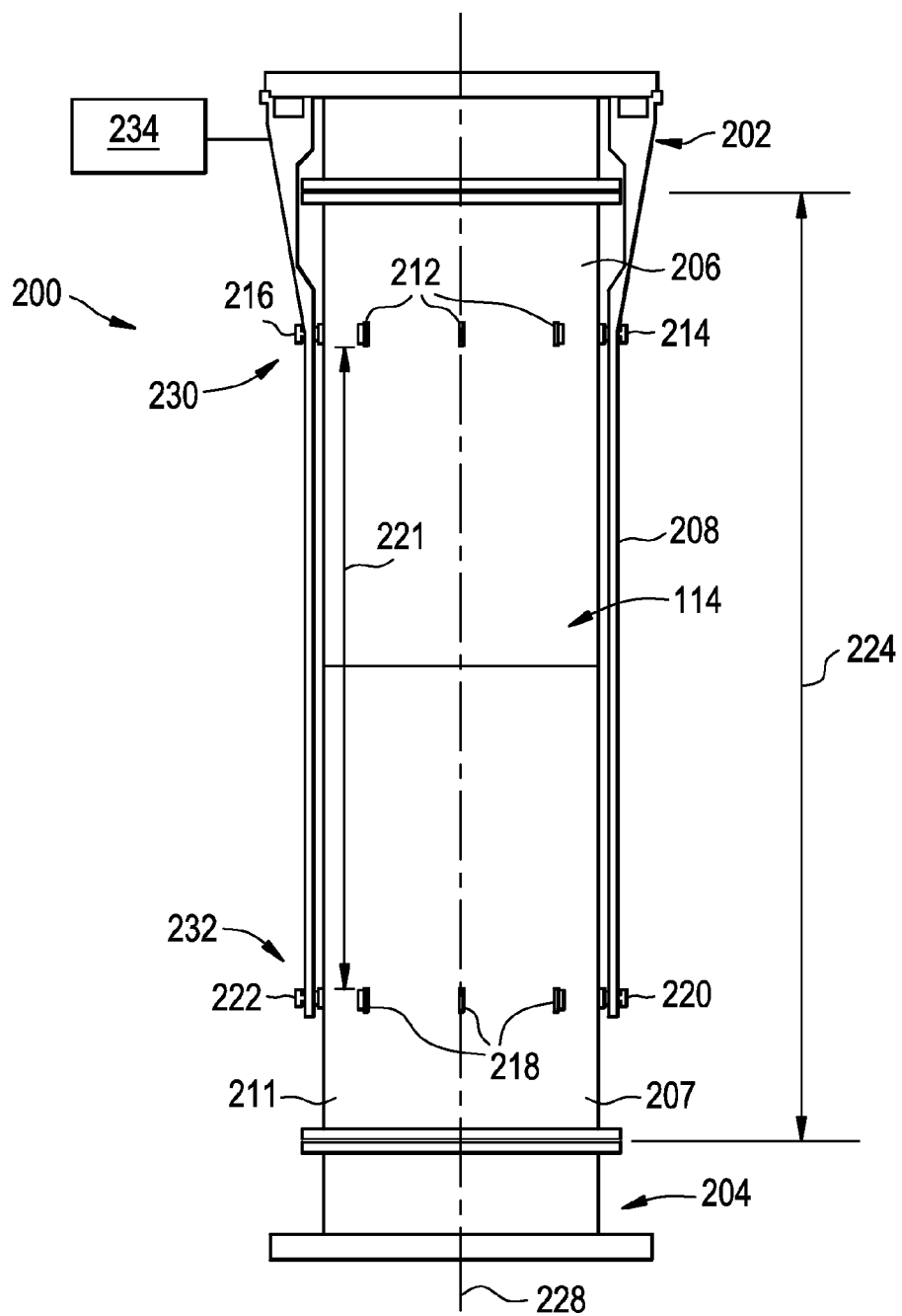
FIG. 2 is a side view of an exemplary calibration apparatus.

FIG. 2 is a side view of an exemplary calibration apparatus 200. The calibration apparatus 200 is configured to perform a calibration of a torque measurement for a rotatable object, such as the shaft 114. The calibration apparatus 200 includes a structure 202 coupled to a first end 206 of the shaft 114 and an adapter 204 coupled to a second end 207 of the shaft 114. The structure 202 includes a first member 208 and a second member 210 extending axially along a surface 211 of the shaft 114. As depicted, the first and second members 208, 210 are disposed on substantially opposite sides (i.e. 180 degrees apart) of the shaft 114. The shaft 114 has teeth 212 protruding from the surface 211 at a first axial location 230, wherein rotational movement of the teeth 212, and the corresponding shaft 114, is measured by a first sensor 214 and a second sensor 216. Similarly, teeth 218 protrude from the surface 211 at a second axial location 232, wherein rotational movement of the teeth 218 is measured by a third sensor 220 and a fourth sensor 222. In embodiments, movement of a suitable marker on the surface 211 of the shaft 114 may be used to measure rotational displacement. Exemplary markers include changes in or on a profile of the surface 211, such as teeth, grooves or reflective markers. The teeth 212 and 218 are spaced apart axially a distance 221 corresponding to the distance between the first and second axial location 232. The exemplary shaft 114 has an overall axial length 224 of greater than about 6 feet. In embodiments, the length 224 is between about 5 and 10 feet. In other embodiments, the length 224 is between about 6 and 8 feet. The exemplary shaft 114 has diameter 226 of greater than about 20 inches. In embodiments, the diameter 226 ranges from about 15 to about 25 inches. In other embodiments, the diameter 226 ranges from about 20 to about 30 inches. As depicted, the shaft 114 is configured to rotate about an axis 228.

In an embodiment, the calibration apparatus 200 receives the shaft 114, wherein the first end 206 is coupled to the structure 202 and the second end 207 is coupled to the adapter 204. The first member 208 and second member 210 house the first set of sensors (214, 216) and second set of sensors (220, 222), respectively. The members 208 and 210 are rigid bodies sufficiently stiff, attached and supported in a manner so as to not bend or move relative to the structure 202 during the measurement process. Further, in an embodiment, the members 208 and 210 are single pieces extending from the structure 202. For example, the members 208 and 210 compensate for movement of the structure 202 because the sensors 214 and 220 move together along with member 208 and sensors 216 and 222 move together with member 210. In one embodiment, the first and second members 208 and 210 may be portions of a single member of a suitable configuration to house sensors on opposite sides of the shaft 114. The exemplary sensors 214, 216, 220 and 222 are precision sensors to determine rotational displacement, such as digital linear sensors or calipers. The sensors 214, 216, 220 and 222 determine rotational displacement by measuring movement of markers on the profile of surface 211, such as the teeth 212, 218. The calibration apparatus 200 also includes a controller 234 configured to receive, send and/or control communications to components of the apparatus, including sensors 214, 216, 220 and 222. Determining or measuring the rotational displacement at two axial locations that are the distance 221 apart enables a determination of angular displacement induced by corresponding known torque imparted on the shaft 114.

In an exemplary torque calibration torque is generated by applying two substantially equal and parallel forces in substantially opposite directions, such as two tangential and opposite forces applied to the shaft 114 via the adapter 204. If the two opposite forces are not equal or not parallel to each other, the shaft 114 may be subject to bending in addition to the known torque applied via the adapter 204. Accordingly, accuracy for measuring torque is improved by positioning sensors on opposite sides of the shaft 114, thereby compensating for bending of the shaft 114. In an embodiment, the calibration apparatus 200 and associated calibration method provide an accuracy of about 0.5% for torque measurements. Thus, the calibration provides improved data for evaluating the performance of turbine equipment. In one embodiment, during a calibration process the adapter 204 applies a known torque greater than about 400,000 ft-lbs. In another embodiment, the adapter 204 applies a known torque greater than about 500,000 ft-lbs. In another embodiment, the adapter 204 applies a known torque greater than about 600,000 ft-lbs. The exemplary sensors 214, 216, 220 and 222 are arranged to provide an angular displacement measurement with an accuracy less than about 0.5%. In addition, the sensors 214, 216, 220 and 222 are configured to measure the rotational displacements to enable determination of the angular displacement value for the shaft 114 of about 0.2 to about 1.0 degrees with a measurement resolution less than about 0.0001 degree.

Figure 3:
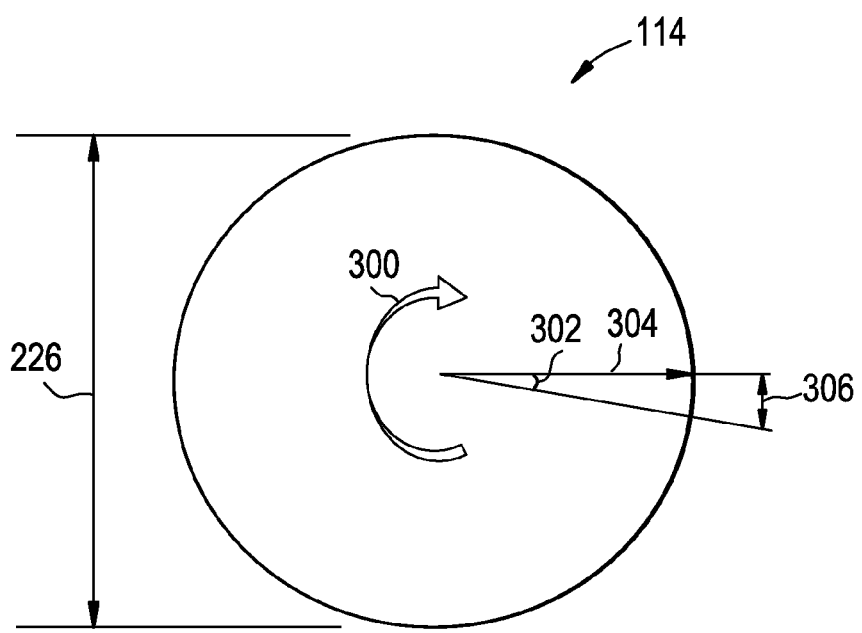
FIG. 3 is a schematic end view diagram of a shaft to be placed in the exemplary calibration apparatus.

FIG. 3 is a schematic end view of the exemplary shaft 114. The diagram depicts a torque 300 being applied to the shaft 114. The applied torque 300 (also referred to as "known applied torque") causes a rotational displacement 306, which is used, along with a radius 304, to determine an angular displacement 302 of the shaft 114. As discussed above the angular displacement 302 at two or more axial locations (230, 232) of the shaft 114 is used to determine a torque value. The determined torque value may be compared to the applied torque 200 and used to calibrate a torque measurement for a turbine system. An exemplary equation used to determine the angular displacement 302 is as follows: $\sin \theta = d/r$, where $\theta$=angular displacement 302, $d$=rotational displacement 306, $r$=radius 304 and $d/r$ is in radians. Thus, the sensors 214, 216, 220 and 222 determine rotational displacement 306, which is used along with the known value of radius 304 to determine angular displacement 302. An exemplary equation used to determine torque is as follows: $T = Kt \cdot A$, where $\theta$=the difference between angular displacements 302 at the first and second axial positions (230, 232), $Kt$=torsional stiffness of the shaft and $T$=determined torque. The exemplary equation and measurements are used to determine angular displacement 302 at various locations on the shaft, including the first and second axial positions 230 and 232, respectively. Thus, the disclosed apparatus provides improved accuracy in determining an angular displacement 302, which improves a torque measurement used to evaluate turbomachinery.

One exemplary process for calibrating a torque measurement may include the following steps. The shaft 114 is coupled to the structure 202, wherein the members 208 and 210 extend along a length of the surface 211. The adapter 204 is also coupled to the shaft 114, wherein the adapter 204 then applies a known torque 300 to the shaft 114. Sensors 214 and 216 then measure a first rotational displacement at the first axial location 230. Similarly, sensors 220 and 222 then measure a second rotational displacement at the second axial location 232. The controller 234 then determines angular displacements of the shaft 114 based on the first and second rotational displacements. The determined angular displacement is used to calculate a determined torque that is compared to the known torque 300. The angular displacement and determined torque values may be determined by suitable calculations, such as those described above. The compared torque values are then used as a calibration for torque measurements of the shaft when installed between a driving turbine and a driven load.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A method for calibrating a torque measurement for a rotatable object, the method comprising:
coupling the rotatable object to a structure, the structure comprising a first member and a second member, each extending along a length of a surface of the rotatable object and disposed on opposite sides of the rotatable object;

coupling the rotatable object to an adapter;

applying a known torque to the rotatable object via the adapter with the rotatable object in a stationary condition;

measuring a first rotational displacement of the rotatable object via a first pair of sensors coupled to the first member and the second member at a first axial location of the rotatable object and circumferentially spaced from each other at an angle of about 180 degrees;

measuring a second rotational displacement of the rotatable object via a second pair of sensors coupled to the first member and the second member at a second axial location of the rotatable object, and circumferentially spaced from each other at an angle of about 180 degrees, thereby accounting for bending of the rotatable object; and determining first and second angular displacements of the rotatable object based on the first and second rotational displacements.

2. The method of claim 1, wherein measuring the first and second rotational displacements comprises measuring each displacement using digital linear sensors.

3. The method of claim 2, wherein measuring using digital linear sensors comprises measuring displacement via changes in a profile of the surface of the rotatable object.

4. The method of claim 1, wherein the rotatable object comprises a shaft with a diameter greater than about 20 inches and a length greater than about 6 feet.

5. The method of claim 1, comprising calibrating a torque measurement using a determined torque based on the determined angular displacements and the known torque.

6. The method of claim 1, wherein applying the known torque comprises applying greater than about 500,000 ft-lbs of torque.

7. The method of claim 1, wherein coupling the rotatable object to the structure comprises coupling a first end of the rotatable object to the structure and wherein coupling the rotatable object to the adapter comprises coupling a second end of the rotatable object to the adapter.

8. An apparatus for calibrating a torque measurement of a rotatable object, the apparatus comprising:

a structure to be coupled to the rotatable object, the structure comprising a first member and a second member, each extending along a length of a surface of the rotatable object and disposed on opposite sides of the rotatable object;

an adapter to be coupled to the rotatable object, wherein the adapter is configured to apply a known torque to the rotatable object with the rotatable object in a stationary condition;

a first pair of sensors coupled to the first member and the second member and positioned to measure a first rotational displacement of the rotatable object at a first axial location of the rotatable object, the first pair of sensors circumferentially spaced from each other at about 180 degrees, thereby compensating for bending of the rotatable object; and a second pair of sensors coupled to the first member and the second member and positioned to measure a second rotational displacement of the rotatable object at a second axial location of the rotatable object, the second pair of sensors circumferentially spaced from each other at about 180 degrees, thereby compensating for bending of the rotatable object.

9. The apparatus of claim 8, wherein the first pair of sensors and the second pair of sensors each comprise a digital linear sensor.

10. The apparatus of claim 9, wherein the digital linear sensors are configured to measure displacement via changes in a profile of the surface of the rotatable object.

11. The apparatus of claim 8, wherein the rotatable object comprises a shaft with a diameter greater than about 20 inches and a length greater than about 6 feet.

12. The apparatus of claim 8, wherein the first pair of sensors and the second pair of sensors are configured to measure the first and second rotational displacements to enable determination of an angular displacement value for the rotatable object of about 0.2 to about 1.0 degrees with measurement resolution less than about 0.0001 degree.

13. The apparatus of claim 8, comprising a processor to determine angular displacements at the first and second axial locations of the rotatable object based on the first and second rotational displacements, the angular displacements corresponding to the known torque applied to the rotatable object.

14. The apparatus of claim 8, wherein the known torque comprises greater than about 500,000 ft-lbs of torque.

15. The apparatus of claim 8, wherein the structure is coupled to a first end of the rotatable object and wherein the adapter is coupled to the rotatable object at a second end.

* * * * *